United States Patent
Ting

(10) Patent No.: US 10,795,489 B2
(45) Date of Patent: Oct. 6, 2020

(54) DETECTING METHOD FOR TOUCH PANEL AND DETECTION CIRCUIT THEREOF

(71) Applicants: IMAGINATION BROADWAY LTD., New Taipei (TW); SALT International Corp., New Taipei (TW)

(72) Inventor: Ko-Hao Ting, New Taipei (TW)

(73) Assignees: IMAGINATION BROADWAY LTD., New Taipei (TW); SALT INTERNATIONAL CORP., New Taipei (TW)

(*) Notice: Subject to any disclaimer, the term of this patent is extended or adjusted under 35 U.S.C. 154(b) by 0 days.

(21) Appl. No.: 15/348,454

(22) Filed: Nov. 10, 2016

(65) Prior Publication Data
US 2017/0139529 A1    May 18, 2017

(30) Foreign Application Priority Data
Nov. 13, 2015    (TW) .............................. 104137519 A

(51) Int. Cl.
G06F 3/041    (2006.01)
G06F 3/044    (2006.01)

(52) U.S. Cl.
CPC ............ G06F 3/0416 (2013.01); G06F 3/044 (2013.01); *G06F 2203/04108* (2013.01)

(58) Field of Classification Search
None
See application file for complete search history.

(56) References Cited

U.S. PATENT DOCUMENTS

| 2009/0224776 A1* | 9/2009 | Keith ................... H03K 17/962 |
| | | 324/686 |
| 2015/0077388 A1* | 3/2015 | Liao ........................ G06F 3/044 |
| | | 345/174 |
| 2016/0306456 A1* | 10/2016 | Slamkul ................ G06F 3/0418 |

* cited by examiner

*Primary Examiner* — Andre L Matthews
(74) *Attorney, Agent, or Firm* — WPAT, PC

(57) ABSTRACT

A detecting method for a touch panel is disclosed. The sensing electrode of the detecting method is indirectly and repeatedly charged several times via the charge holding capacitor circuit to reach a certain higher voltage. The driving electrode is switched to the first voltage or the second voltage under the cooperation of the driving circuit when several measuring cycle is conducted. After the voltage is switched every time, several measured values of different situations are obtained rapidly so as to eliminate the noise to get the best signal via several measured values. There is only to wait the balancing time in the measuring cycle, which effectively shortens the reaction time of the touch detecting.

20 Claims, 4 Drawing Sheets

DETECTING METHOD FOR TOUCH PANEL AND DETECTION CIRCUIT THEREOF

CROSS-REFERENCE TO RELATED APPLICATIONS

This application claims the benefit of priority to Taiwan patent application Ser. No. 104137519 entitled "DETECTING METHOD OF TOUCH PANEL AND DETECTION CIRCUIT THEREOF", filed Nov. 13, 2015, which is also incorporated herein by reference.

FIELD OF THE INVENTION

The present invention pertains to a detecting method for an identification device, and particularly relates to a detecting method and detection circuit thereof that can quickly get touch signal of a touch panel.

BACKGROUND OF THE INVENTION

A touch panel or touch screen is one of the major interfaces between human and machine, and as a recognition device, can ingeniously combine input and display interfaces, and therefore has the advantages of saving device space and user-friendly operation. Nowadays it has been generally applied to a wide variety of consuming or industrial electronic products. For example, PDAs (Personal Digital Assistant), palm-sized PCs (Personal Computers), tablet computers, mobile phones, handwriting input devices for a smart phone, IAs (Information Appliances), ATMs (Automated Teller Machines) and POS (Points-of-Sale), etc., which can generally be seen in various occasions of business and industry applications.

The detection method in the prior art subtracts the signal to eliminate the noise, by the way of repeating a measuring cycle to obtain more than two different detection voltage signal and then subtracting it to eliminate the noise for a contact signal.

Besides, U.S. patent Ser. No. 12/466,230 of the prior art discloses a different detection method, comparing the several signals from the measured cycling and the accepted value range between the maximum and the minimum, abandoning the signal beyond the scope, determining the touch location by the change of one or several signals within the accepted range. In addition, TW Patent No. 100112718 discloses another way, scanning the capacitive matrix for the touch screen in rows and in lines respectively, and in two rows or in two lines at the same time to get the capacitance difference, or in one row or in one line to get the capacitance difference, proceeding to the date process then.

Summarily, the detection methods above have many shortcomings, it needs to measure the sensing electrode when the driving electrode is uncharged, the reaction time is slowed down. Besides, every measuring cycle needs ground discharging, driving, waiting for the potential balance, discharging, waiting for the discharging to finish, so much unnecessary time is wasted, the reaction speed of the touch detection is slowed down also. Therefore, there is a need for a new method with time saving and better signal performance.

SUMMARY OF THE PRESENT INVENTION

The present invention provides an improved detecting method for a touch panel and a detecting circuit thereof, which effectively excludes the noise interference during the detecting so as to shorten the processing time.

In order to achieve one, some or all of the above stated objectives or others, a detecting method for a touch panel according to the embodiments of the present invention is provided. The detecting method for a touch panel, the touch panel includes at least one driving electrode and at least one sensing electrode, the detecting method comprising: initializing the driving electrode and the sensing electrode so that both of the driving electrode and the sensing electrode are in a grounding state; coupling the sensing electrode to a charge holding capacitor circuit; switching the sensing electrode to a floating state; after the charging process of the charge holding capacitor circuit is done, charging the sensing electrode by the charge holding capacitor circuit; switching the driving electrode to an initial voltage; disconnecting the charge holding capacitor circuit and the sensing electrode after the balance of potential is completed, and measuring the charge holding capacitor circuit by an analog to digital converter to obtain an initial value; conducting a measuring cycle, the measuring cycle comprising: switching the driving electrode to a first voltage or a second voltage according to a switching mode, the switching mode depends on the back-end filter; coupling the sensing electrode to the charge holding capacitor circuit; and disconnecting the charge holding capacitor circuit and the sensing electrode after the balance of potential is completed, and measuring the charge holding capacitor circuit by the analog to digital converter to obtain a measured value; repeating the measuring cycle to obtain a plurality of the measured values; switching the sensing electrode to the grounding state; and switching the driving electrode back to the grounding state.

In better embodiment of the present invention, the detecting method further comprises a process of calculating the initial value and the measured values by a controlling unit to obtain a signal value.

In order to achieve one, some or all of the above stated objectives or others, a detecting circuit for a touch panel according to the embodiments of the present invention is provided. The detection circuit for a touch panel, the touch panel includes at least one driving electrode and at least one sensing electrode, comprising: a charge holding capacitor circuit, selectively coupling with the sensing electrode; a charging circuit, selectively coupling with the charge holding capacitor circuit; and a driving circuit, for driving electrode being switchable between a grounding state or any voltage; an analog to digital converter, electrically coupling with the sensing electrode; and a controlling unit, electrically coupling with the charge holding capacitor circuit, the driving circuit, the analog to digital converter, the driving electrode and the sensing electrode, the controlling unit performs the above detecting method.

The sensing electrode of the present invention is indirectly and repeatedly charged several times via the charge holding capacitor circuit to reach a certain higher voltage. The driving electrode is switched to the first voltage or the second voltage under the cooperation of the driving circuit when several measuring cycle is conducted. After the voltage is switched every time, several measured values of different situations are obtained rapidly, there is only to wait the balancing time, so as to eliminate the noise to get the best signal via several measured values. Compared with the prior art, the measuring cycle of the present invention is conducted only the balancing time is needed, every measuring cycle in the prior art needs ground discharging, driving, waiting for the potential balance, discharging, waiting for the discharging to finish. The present invention effectively shortens the reaction time of the touch detecting. In addition, the electromagnetic interference from the environment and the power, the noise caused by induced electric field from the driven LCD screen is deduced, especially the low frequency noise.

DETAILED DESCRIPTION OF THE INVENTION

The present invention can be more fully understood by reading the following detailed description of the preferred embodiments, with reference made to the accompanying drawings. It is to be understood that both the foregoing general description and the following detailed description are exemplary and explanatory only and are not restrictive of the invention, as claimed. It should be noted that, as used in the specification and the appended claims, the singular forms "a", "an" and "the" include plural referents unless the context clearly dictates otherwise. Thus, for example, reference to "a display" may include multiple displays, and the like. References cited herein are hereby incorporated by reference in their entirety, except to the extent that they conflict with teachings explicitly set forth in this specification.

Figure 1:
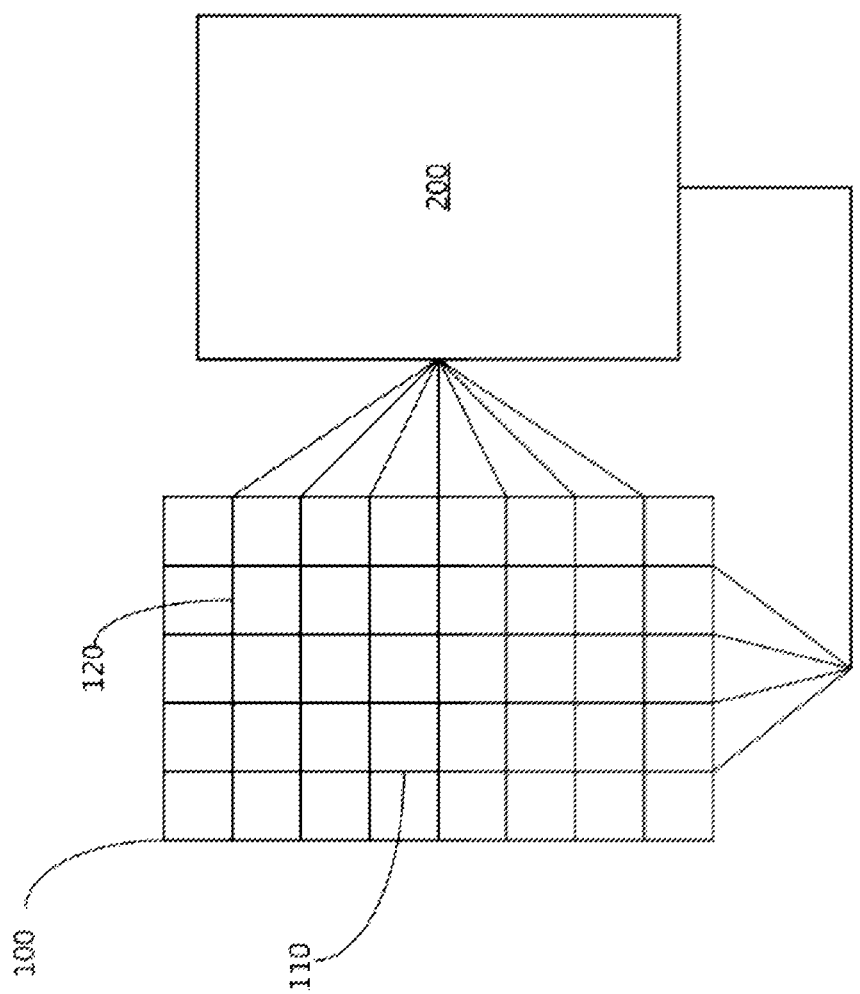
FIG. 1 depicts a diagram of a touch panel and the detection circuit thereof according to an embodiment of the present invention.

Please refer to FIG. 1, FIG. 1 shows a capacitive touch panel 100 and the detection circuit 200 thereof according to an embodiment of the present invention. The touch panel 100 includes at least one driving electrode 110 and at least one sensing electrode 120. The driving electrode 110 and the sensing electrode 120 are made of conductive materials in matrix and the sensing electrode 120 is above the driving electrode 110. The driving electrode 110 is made of stripes in rows, the sensing electrode 120 is made of strips in lines. The capacitive touch panel 100 with matrix structure electrically couples with the detection circuit 200 to perform touch control function.

Figure 2:
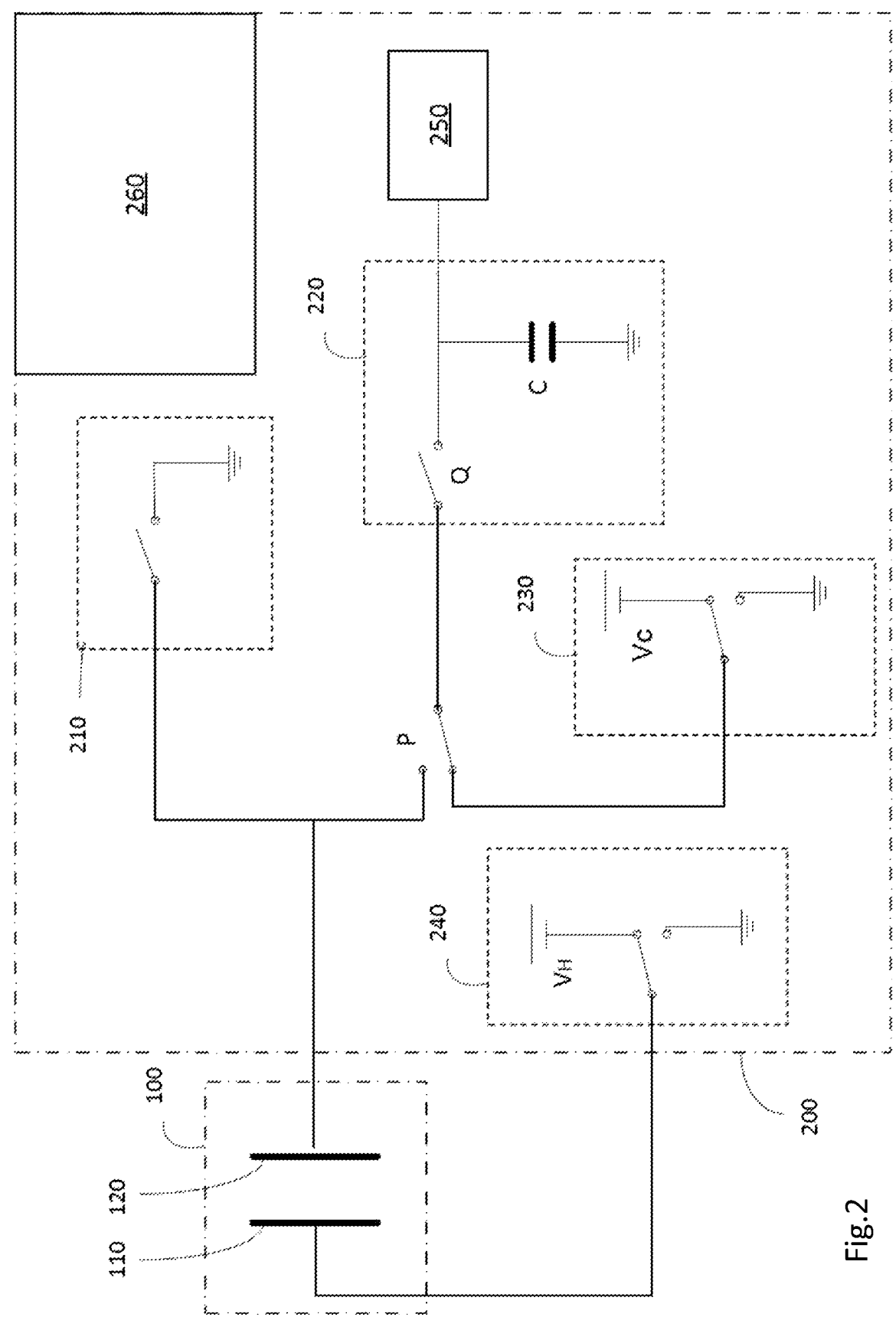
FIG. 2 depicts a schematic diagram of the detection circuit for a touch panel according to an embodiment of the present invention.

The schematic diagram of the detection circuit 200 for the touch panel 100 according to the present invention is shown in FIG. 2. The detection circuit 200 includes a switching circuit 210, a charge holding capacitor circuit 220, a charging circuit 230, a driving circuit 240, an analog to digital converter 250 (ADC) and a controlling unit 260. The controlling unit 260 is electrically coupling with the switching circuit 210, the charge holding capacitor circuit 220, the driving electrode 240, the analog to digital converter 250, the driving electrode 110 and the sensing electrode 120 so as to control the detecting method of the detection circuit 200 for the touch panel 100.

The switching circuit 210 is selectively coupled with the sensing electrode 120, the sensing electrode 120 is in a grounding state when the switching circuit 210 coupled with the sensing electrode 120, the sensing electrode 120 is in a floating state when the switching circuit 210 disconnect with the sensing electrode 120. The charge holding capacitor circuit 220 is selectively coupled with the sensing electrode 120 via two switches P&Q which is one kind of multiplexer. The charging circuit 230 is selectively coupled with the charge holding capacitor circuit 220 via the switches P&Q to provide a charging voltage $V_c$. The sensing electrode 120 is indirectly charged by the charging circuit 230 via the charge holding capacitor circuit 220 under the control of the switches P&Q. The driving circuit 240 can switch the driving electrode 110 to the grounding state or provide any voltage $V_H$ for the driving electrode 110. The voltage $V_H$ includes an initial voltage, a first voltage and a second voltage. The charge holding capacitor circuit 220 is measured by an analog to digital converter 250 by means of disconnecting the contact between the charge holding capacitor circuit 220 and any other circuit or electrode via the switch P/Q.

Figure 3:
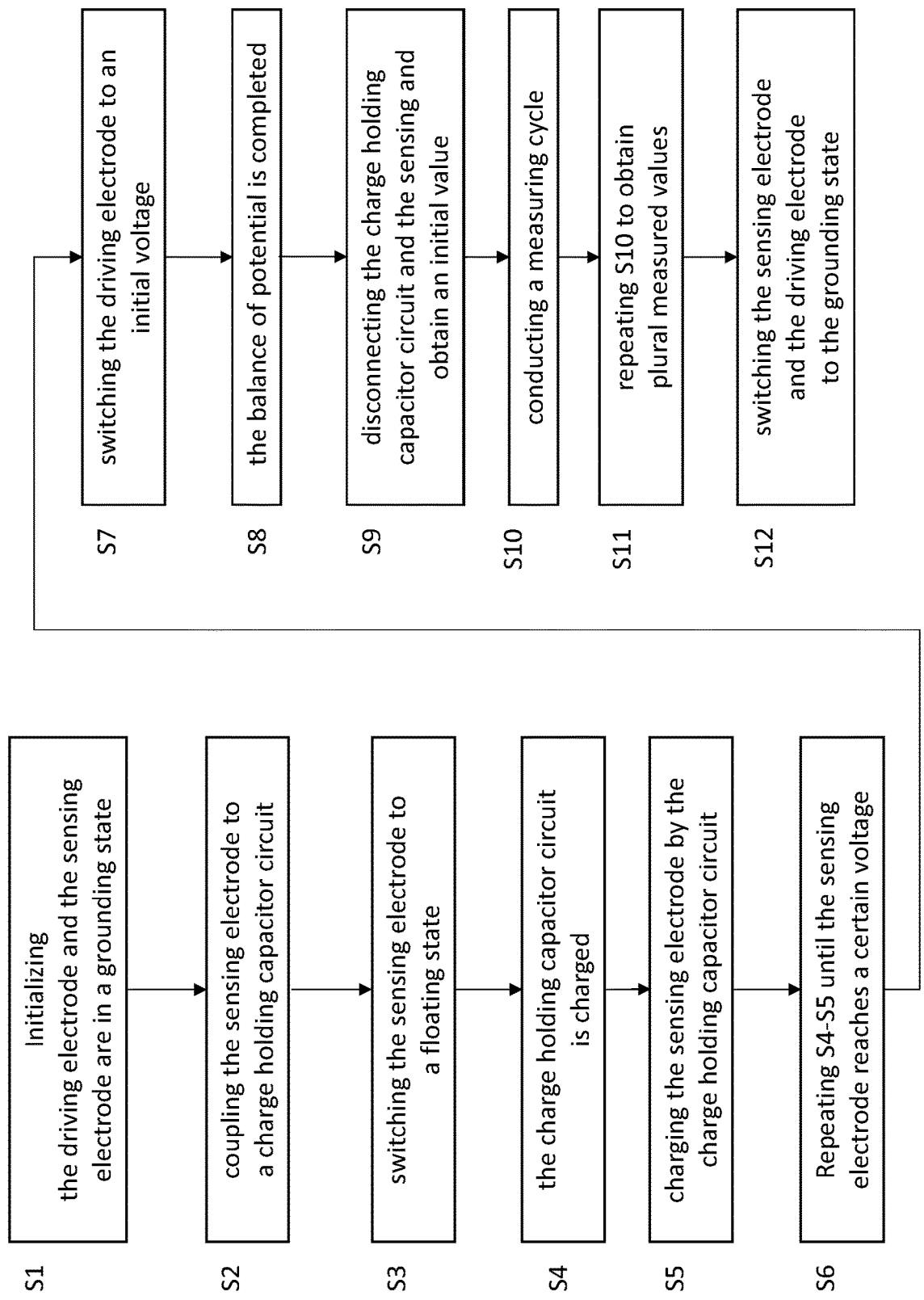
FIG. 3 depicts a flow chart of the detection method for a touch panel according to an embodiment of the present invention.
Figure 3A:
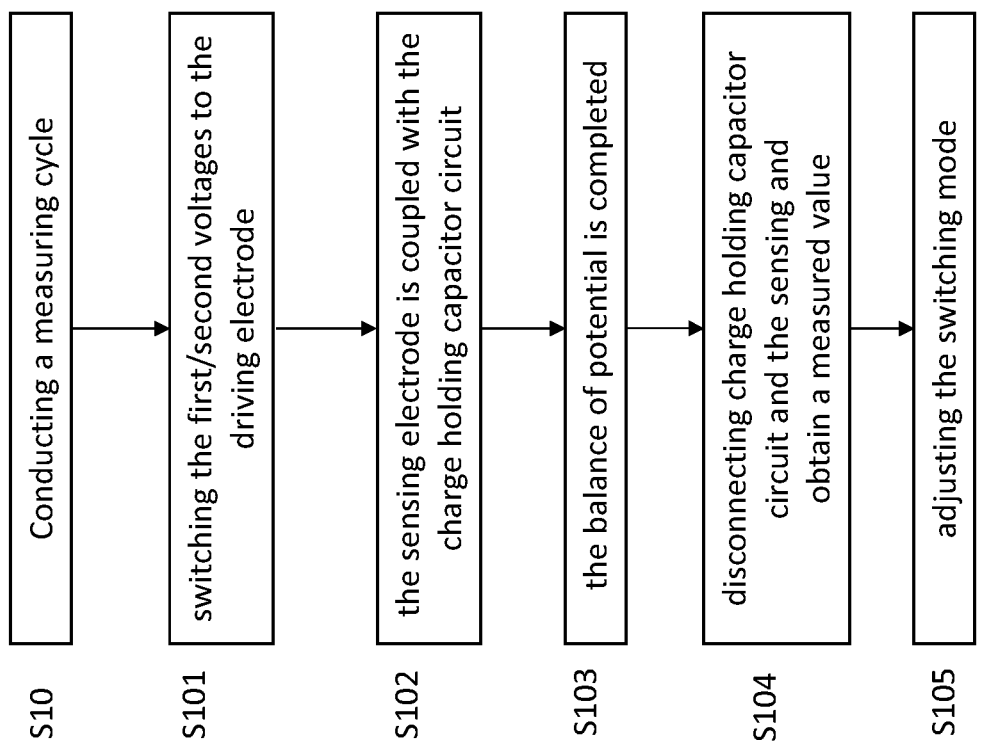
FIG. 3A depicts a block diagram of the measuring cycle process according to an embodiment of the present invention.

FIGS. 3&3A depict flow charts of the detection method and the measuring cycle process for a touch panel according to an embodiment of the present invention. Refer to FIG. 2 showing a schematic diagram of the detection circuit, the detection method is used for the touch panel above. The detection method of the present invention includes three phases, the first phase is a starting process which comprises steps of S1-S9, the second phase is a loop process which comprises steps of S10-S11, and the third phase is an ending process which comprises steps of S10-S12. The steps includes:

Step S1: The controlling unit 260 initializes the driving electrode 110 and the sensing electrode 120 so that both of the driving electrode 110 and the sensing electrode 120 are in a grounding state. Residual charges on the driving electrode 110 and the sensing electrode 120 is cleared as the driving electrode 110 and the sensing electrode 120 are in a grounding state.

Step S2: The controlling unit 260 controls the switches P&Q so that the sensing electrode 120 is coupled with the charge holding capacitor circuit 220.

Step S3: Through a first delayed discharge, the sensing electrode 120 is switched to be in a floating state by the controlling unit 260 via the switching circuit 210 while the driving electrode 110 is still in a grounding state.

Step S4: The controlling unit 260 controls the switches P&Q so that the charging circuit 230 couples with the charge holding capacitor circuit 220 to charge the charge holding capacitor circuit 220 in a certain charging voltage $V_c$.

Step S5: Next, the controlling unit 260 controls the switches P&Q to charge the sensing electrode 120 by the charge holding capacitor circuit 220.

Step S6: Repeating the steps S4-S5 until the sensing electrode 120 reaches a certain voltage. The certain voltage includes the average value of the charging voltage $V_c$ provided for the charging circuit 230 or the half $V_c/2$.

Step S7: The controlling unit 260 controls the driving circuit 240 to convert the driving electrode 110 from grounding state to the state of providing an initial voltage $V_H$.

Step S8: The electric charges on the driving electrode 110 and the sensing electrode 120 remains stable though a second delay while the balance of potential is completed.

Step S9: The charge holding capacitor circuit 220 disconnects with the sensing electrode 120 when the controlling unit 260 controls the switches P or Q. Next, measuring the charge holding capacitor circuit 220 by an analog to digital converter 250 to obtain an initial value. Through a third delay after the measuring is finished, the controlling unit 260 determines whether to adjust the measuring frequency of an uncertain value for the switching mode based on the back-end filter (not shown); in other words, from the starting process to the loop process.

Step S10: Conducting a measuring cycle by the controlling unit 260, which means it is entering the loop process. As in FIG. 3A, the flowchart of the measuring cycle S10 includes the steps S101 to S105.

Step S101: The controlling unit 260 drives the driving circuit 240 to maintain the initial voltage during the S7, or to provide the first voltage for the driving electrode 110, or to switch the second voltage to the driving electrode 110 according to the switching mode. In the embodiment of the present invention, the initial voltage is any voltage above 0, the first voltage includes 0V and any voltage below 5V, the second voltage includes 18V and any voltage above 5V. In step 101, the controlling unit 260 decides the switching mode based on the back-end filter (not shown) according to S9.

Step S102: The controlling unit 260 controls the switches P&Q so that the sensing electrode 120 is coupled with the charge holding capacitor circuit 220.

Step S103: The electric charges on the driving electrode 110 and the sensing electrode 120 remains stable through a fourth delay after the balance of potential is completed. The fourth delay period is longer than the third delay period in the embodiment of the present embodiment.

Step S104: The charge holding capacitor circuit 220 disconnects with the sensing electrode 120 when the controlling unit 260 controls the switches P&Q. Next, a measured value is obtained by measuring the charge holding capacitor circuit 220 via an analog to digital converter 250.

Step S105: Through a third delay after the measuring is finished, the controlling unit 260 determines whether to adjust the switching mode based on the back-end filter proceeding to the next step. S105 is the result of the controlling unit 260 based on S104. The back-end filter determines whether to change the switching mode, so that the driving electrode 110 continually remains on the first voltage when S11 repeats S101 of the measuring cycle in S10; or the driving electrode 110 continually remains on the second voltage; or the driving electrode 110 continually remains on the first voltage of several times after remaining on the second voltage of several times; or the driving electrode 110 continually remains on the second voltage of several times after remaining on the first voltage of several times; or the driving electrode 110 remains on the first voltage and the second voltage in turn. The changing of the first voltage and the second voltage depends on the back-end filter.

Step S11: Repeating the measuring cycle in S10 to get several measured values. The repeating times are odd in the embodiment of the present invention. If there is a need to cease the measuring cycle S10, which also means preparing from the loop process to the ending process, S105 in measuring cycle S10 is omitted and the last measuring cycle S10 is conducted before S12.

Step S12: Proceed to the ending process. The detection process is ended as the driving electrode 110 and the sensing electrode 120 are converted to the grounding state.

When the driving electrode 110 is switched to the first voltage (it is referred to any voltage of 0 V or below 5V) in the measuring cycle S10, a plurality of first measured values are read which includes only noise and a first base value. When the driving electrode 110 is switched to the second voltage (it is referred to a higher voltage of 18 V or above 5V) in the measuring cycle S10, a plurality of second measured values are read. If any object is proximate to the touch panel, the second measured value includes noise, a second base value and a first contact value. If no object is proximate to the touch panel, the second measured value includes only noise and the second base value.

Finally, the initial value obtained in S9 and several measured values obtained in S10-S11 cannot be used alone as noise is included, thus, it's impossible to tell the touch signal of the object. A usable touch signal is obtained by handling the values above via the controlling unit 260. After conducting the detection method of Starting-Loop-Ending, the initial value and measured values are obtained, which include the second measured values of m numbers when the driving electrode 110 remains on the second voltage and the first measured values of n numbers when the driving electrode 110 remains on the first voltage, the second measured values include noise, the second base value and/or the first contact value. It's worth mentioning the number of m and n is positive integer.

The controlling unit 260 inputs the values of m+n numbers to the back-end filter, noise is cleared after data processing, the data processing includes amplifying the useable signal and a filtering operation. It's worth mentioning the number of m and n depends on the back-end filter, one of m or n can be zero in one embodiment of the present invention. If there is any object proximate to the touch panel, the controlling unit 260 outputs a third base value and a second contact value of a certain magnification. If no object is proximate to the touch panel, the third base value of a certain magnification is output by the controlling unit 260. The third base value of the certain magnification is used as a basis of the data processing. Useable touch signal is gained after the controlling unit 260 processing the third base value and the second contact value of the certain magnification to eliminate the noise of lower frequency. Besides, frequency hopping is preferred after gaining the touch signal to achieve better touch signal.

In a better embodiment, the driving electrode 110 is made of stripes in rows, the sensing electrode 120 is made of strips in lines. The strips of the sensing electrode 120 are measured by the analog to digital converter 250, in order to produce several initial values or measured values. Next, further calculation is conducted by the controlling unit 260 based on the average of the initial values and the average of the measured values.

In the above embodiment, the driving electrode 110 is defined in a grounding state when the starting process is initialized, then it is switched to any voltage $V_H$ to detect the touch signal of the operating object by means of changing the voltage of the driving electrode via the driving circuit 240. Thus, in S12 of the ending process, the driving electrode 110 is back to the initial state (grounding state) by the driving circuit 240. However, if the initialization conditions of the detection method differ during the three processes, the driving electrode 110 is defined on any voltage $V_H$ when the starting process is initialized, then changed to the grounding state after that. The driving electrode 110 is back to the initialized state (any voltage $V_H$) by the driving circuit 240, which can also detect the touch signal of the operating object. The state of the driving electrode 110 isn't limited whether on a grounding state or any voltage in the initializing process.

The sensing electrode 120 is switched to the grounding state by the controlling unit 260 via the switching circuit 210 only in the last step of S12 and the initializing of S1 during the detection method process of the detection circuit. It is not necessary to make the sensing electrode 120 in a grounding state for conducting the starting process during the steps S2-S9 and the loop process during the steps S10-S11. The driving electrode is switched to the first voltage or the second voltage for several times via the driving circuit during the step S10, the measuring cycle is conducted after every switch is finished through the potential is balanced.

The invention provides a plurality of measured values in different modes as the measuring cycle is conducted rapidly and gets better touch signal via a plurality of values filtering the noise. Further, the sensing electrode of the invention reaches a certain higher voltage via the charge holding capacitor circuit, when the measuring cycle is conducted at the first voltage, the problem of incapable of measuring is avoided. Besides, the electromagnetic interference from the environment and the power, the noise caused by induced electric field from the driven LCD screen is deduced, especially the low frequency noise.

What is claimed is:

1. A detecting method for a touch panel, the touch panel includes at least one driving electrode and at least one sensing electrode, the detecting method comprising:
   initializing the driving electrode and the sensing electrode to a grounding state;
   charging the sensing electrode by coupling the sensing electrode to a charge holding capacitor circuit;
   switching the driving electrode to an initial voltage;
   disconnecting the charge holding capacitor circuit and the sensing electrode once potential balance is reached, and then measuring the charge holding capacitor circuit by an analog to digital converter to obtain an initial value;
   conducting a measuring cycle, comprising:
      switching the driving electrode between a first voltage and a second voltage;
      coupling the sensing electrode to the charge holding capacitor circuit;
      disconnecting the charge holding capacitor circuit and the sensing electrode once potential balance is reached, and then measuring the charge holding capacitor circuit by the analog to digital converter to obtain a measured value; and
   repeating the measuring cycle to obtain a plurality of the measured values;
   wherein a plurality of first measured values are obtained when the driving electrode is switched to the first voltage during the measuring cycle, and a plurality of second measured values are obtained when the driving electrode is switched to the second voltage during the measuring cycle;
   wherein the plurality of first measured values has a quantity m, the plurality of second measured values has a quantity n, and each of m and n is 0 or positive integer determined by a controller; and
   wherein the controller obtains a third base value with magnification and a second contact value with magnification by clearing noise from the first measured values and the second measured values.

2. The detecting method according to claim 1, wherein further comprising calculating the initial value and the measured values by the controller to obtain a signal value.

3. The detecting method according to claim 1, wherein the first voltage is from 0V to 5V, and the second voltage is from 5V to 18V.

4. The detecting method according to claim 1, wherein the first measured values include only noise and a first base value; and wherein the second measured values include only noise and a second base value, or the second measured values include noise, the second base value and a first contact value.

5. The detecting method according to claim 1, wherein further comprising obtaining a touch signal based on the third base value and the second contact value by the controller.

6. The detecting method according to claim 1, wherein steps of charging the sensing electrode and disconnecting the charge holding capacitor circuit and the sensing electrode are repeated until the sensing electrode reaches a certain voltage value.

7. The detecting method according to claim 1, wherein the driving electrode maintains on the first voltage, and then switches to the second voltage while the analog to digital converter severally measures the charge holding capacitor circuit to obtain the measured values.

8. The detecting method according to claim 1, wherein the driving electrode maintains on the second voltage for obtaining several consecutive measured values.

9. The detecting method according to claim 1, wherein the driving electrode switches alternatively between the first voltage and the second voltage in turn for obtaining the measured values by measuring the charge holding capacitor circuit with the analog to digital converter.

10. The detecting method according to claim 1, wherein further comprising adjusting frequency for step of repeating the measuring cycle.

11. A detection circuit for a touch panel, the touch panel includes at least one driving electrode and at least one sensing electrode, comprising:
   a charge holding capacitor circuit, selectively coupling with the sensing electrode;
   a charging circuit, selectively coupling with the charge holding capacitor circuit;
   a driving circuit, for switching the driving electrode between a grounding state or any voltage;
   an analog to digital converter, electrically coupling with the sensing electrode; and
   a controller, electrically coupling with the charge holding capacitor circuit, the driving circuit, the analog to digital converter, the driving electrode, and the sensing electrode;
   wherein the controller executes steps:
      initializing the driving electrode and the sensing electrode to a grounding state;
      charging the sensing electrode by coupling the sensing electrode to the charge holding capacitor circuit;
      switching the driving electrode to an initial voltage;
      disconnecting the charge holding capacitor circuit and the sensing electrode once potential balance is reached, and then measuring the charge holding capacitor circuit by the analog to digital converter to obtain an initial value; and
      conducting and repeating a measuring cycle to obtain a plurality of measured values;
   wherein the measuring cycle comprises:
      switching the driving electrode between a first voltage and a second voltage;
      coupling the sensing electrode to the charge holding capacitor circuit; and
      disconnecting the charge holding capacitor circuit and the sensing electrode once potential balance is reached, and then measuring the charge holding capacitor circuit by the analog to digital converter to obtain one of the measured values;

wherein a plurality of first measured values are obtained when the driving electrode is switched to the first voltage during the measuring cycle, and a plurality of second measured values are obtained when the driving electrode is switched to the second voltage during the measuring cycle;

wherein the plurality of first measured values is has a quantity m, the plurality of second measured values has a quantity n, and each of m and n is 0 or positive integer determined by the controller; and wherein the controller obtains a third base value with magnification and a second contact value with magnification by clearing noise from the first measured values and the second measured values.

12. The detection circuit according to claim 11, wherein the controlling unit controller calculates a signal value based on the initial value and the measured values.

13. The detection circuit according to claim 11, wherein the first voltage is from 0V to 5V, and the second voltage is from 5V to 18V.

14. The detection circuit according to claim 11,
wherein the first measured values include only noise and a first base value; and
wherein the second measured values include only noise and a second base value, or the second measured values include noise, the second base value and a first contact value.

15. The detection circuit according to claim 11, wherein the controller processes the third base value and the second contact value with magnification to obtain a touch signal.

16. The detection circuit according to claim 11, wherein the controller repeats charging the sensing electrode until the sensing electrode reaches a certain voltage value.

17. The detection circuit according to claim 11, wherein the driving electrode maintains on the first voltage, and then switches to the second voltage while the analog digital converter severally measures the charge holding capacitor circuit to obtain the measured values.

18. The detection circuit according to claim 11, wherein the driving electrode maintains on the second voltage for obtaining several consecutive measured values.

19. The detection circuit according to claim 11, wherein the driving electrode switches alternatively between the first voltage and the second voltage in turn for obtaining the measured values by measuring the charge holding capacitor circuit with the analog to digital converter.

20. The detection circuit according to claim 11, wherein further comprising adjusting repeating frequency to conduct the measuring cycle.

* * * * *